US006409516B1

(12) United States Patent
Thill

(10) Patent No.: US 6,409,516 B1
(45) Date of Patent: Jun. 25, 2002

(54) POSABLE SKELETON

(76) Inventor: Gerald D. Thill, 100 SE. Second St. #1102, Minneapolis, MN (US) 55414

( * ) Notice: Subject to any disclaimer, the term of this patent is extended or adjusted under 35 U.S.C. 154(b) by 0 days.

(21) Appl. No.: 09/479,683

(22) Filed: Jan. 7, 2000

(51) Int. Cl.[7] .............................................. G09B 23/28
(52) U.S. Cl. ..................................................... 434/274
(58) Field of Search ................................ 434/262, 272, 434/274; 446/373, 374, 375

(56) References Cited

U.S. PATENT DOCUMENTS

| 604,243 A | * | 5/1898 | Verpillier | 446/375 |
| 983,547 A | * | 2/1911 | Fleck | 434/274 |
| 1,347,993 A | * | 7/1920 | Dawley | 446/375 |
| 2,988,823 A | * | 6/1961 | Rosenbloom | 434/272 |
| 2,995,833 A | * | 8/1961 | Bezark | 434/274 |
| 3,010,223 A | * | 11/1961 | Alderson | 446/375 |
| 3,716,942 A | * | 2/1973 | Garcia | 446/375 |
| 3,762,070 A | * | 10/1973 | Culver | 434/274 |
| 3,962,801 A | * | 6/1976 | Gonzalez | 434/274 |
| 4,274,224 A | * | 6/1981 | Pugh | 446/375 |
| 4,276,032 A | * | 6/1981 | Woley | 434/274 |
| 4,623,319 A | * | 11/1986 | Zaruba | 446/373 |
| 4,773,865 A | * | 9/1988 | Baaldwin | 434/274 |
| 4,802,858 A | * | 2/1989 | Lindskog | 434/274 |
| 4,850,877 A | * | 7/1989 | Mason | 434/274 |
| 5,017,173 A | * | 5/1991 | Shapero | 446/374 |
| 5,018,977 A | * | 5/1991 | Wiley | 434/274 |
| 5,044,960 A | * | 9/1991 | DePorteous | 434/274 |
| 5,152,692 A | * | 10/1992 | Richards | 434/274 |
| 5,607,311 A | * | 3/1997 | Browne-Wilkinson | 434/274 |
| 6,126,509 A | * | 10/2000 | Berman | 446/418 |

FOREIGN PATENT DOCUMENTS

GB          2204175     * 11/1988     ................ 434/274

* cited by examiner

Primary Examiner—Derris H. Banks
Assistant Examiner—Kurt Fernstrom
(74) Attorney, Agent, or Firm—Drinker Biddle & Reath LLP

(57) ABSTRACT

A posable skeleton or mannequin is made by connecting together bones or bone groups by joints which permit posing the skeleton in many positions. The positions might be a selected point in motion or at rest for an individual of the species of the skeleton. Bones are made hollow to keep them light weight and are therefore, cast in two pieces, each of which is provided with alignment means which may consist of parallel pins on the edge of one piece interfitting holes in similar opposed positions on the other piece to assure proper alignment of the pieces. Intermediate the edges, tubular alignment bosses guide screws to threaded connection bosses which allow the pieces to be assembled by screws. Relatively rotating members of the joint are preferably provided with radial interengaging teeth for incremental positioning moving from one side of a tooth to another.

23 Claims, 13 Drawing Sheets

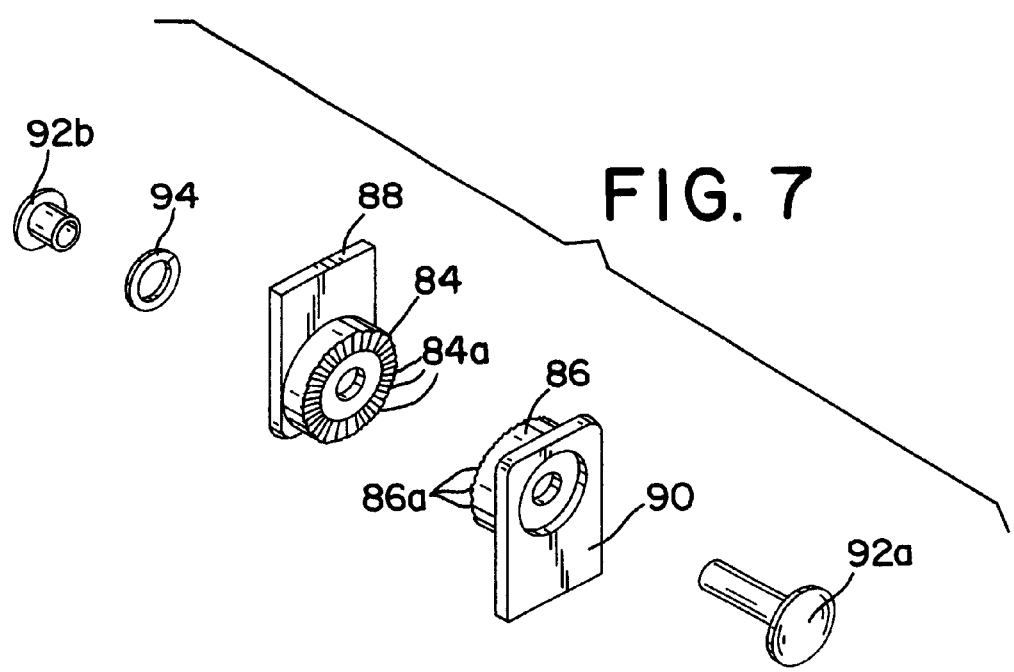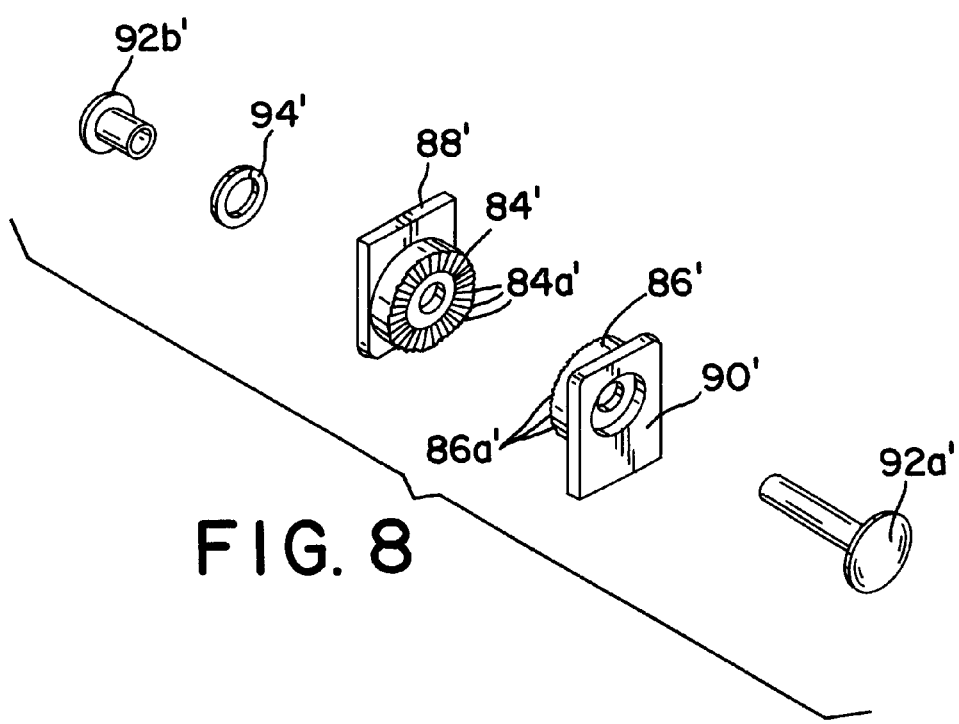

POSABLE SKELETON

This invention relates to a simulated skeleton having three dimensional pieces that look like bones or bone masses, such as the hands, feet, body portions, etc., where the detail of individual bones is not needed for relative movement. The individual pieces of the simulated skeleton are connected together so that they may be moved relative to one another and positioned in a selected posture or pose. The poses permit the skeleton to appear to be in the process of some movement, standing in a particular posture, sitting, or the like. These effects are achieved by providing adjustable joints between moveable bone masses which connect the simulated bones together but permit relative movements to selected positions. The parts will maintain their position relative to one another once set, until further readjustment.

Although the invention was developed for use in the posable skeleton, some of the structure is more broadly useful in human mannequin or animal representations. In this regard, the joints in particular have wider application as do the construction of bone and/or body parts.

BACKGROUND OF THE INVENTION

In the prior art, mannequins and animated creatures of various types have been simulated in various types of posable configurations. These configurations may involve various types of pin connections which allow some relative movement but often require tightening of screws, or the like, to hold the movable parts in the selected position. Skeletons and other Halloween creatures have tended to be even simpler, usually two dimensional pieces of cardboard held together by fasteners which permit relative movement of the parts.

Although it is true that skeletons have been made for medical and teaching purposes, because of the need for anatomical correctness these structure are often not provided with joints which permit posability.

SUMMARY OF THE INVENTION

This invention concerns a posable human skeleton, or other animated creatures, which can be used for decorative purposes and which allows positioning of parts in a natural way. When set in a selected desired position the parts do not need to be further adjusted and, absent external forces, will retain that set position until later repositioning. This result is achieved by use of joints which hold the parts together but yield to rotational repositioning forces and permit repositioning at many discrete rotational positions.

The invention also relates to a joint connecting adjacent relatively rotatable body parts having opposed toothed joint members in which are arranged generally radially directed interfitting teeth. The teeth are shaped to inhibit rotation when the teeth are together at rest and to permit rotation under rotational forces applied to the body parts which necessarily require relative axial movement of the teeth in order to move the rotationally opposed toothed members. Means is provided to assure axial alignment of the toothed joint members. Means is provided normally urging the teeth together, but such that the members are axially yieldable under rotational force to permit relative rotation of the body parts.

The rotatable members may be supported such that one of the rotatable members can move axially relative to the other, and resilient means is interposed between the means holding the rotatable members together such that the resilient means will be able to yield under axial pressure applied to the teeth as body parts are moved from one position to another. Resilient means, may be a spring, such as a compression spring, urging the rotatable toothed members together, or it may be a washer of resilient compressible material, or it may be the inherent resiliency of the material of which the toothed members themselves are made.

The invention also relates to means for mechanically attaching the rotatable toothed members to the body parts or skeleton bone pieces, and involves flanged means integral with the rotatable toothed member, such as a flange simultaneously cast of the same material or having a flanged member otherwise rigidly attached and of a non-circular shape, with lateral surfaces which conform in shape to a cavity in the body part to assure that rotation cannot occur between the body part and the rotatable toothed member.

Also in this invention body parts may be made in two pieces, or possibly more, each of which is a precision molded cast hollow piece such that when the pieces are assembled together, they constitute a lightweight limb or body part. Each of the hollow pieces has narrow edges which fit matching edges of the other hollow pieces of the limb or body part. Cooperating alignment means are provided at least in spaced positions around the edges, on the opposed edges, to assure that when the alignment means are engaged, the edges of the pieces fit together properly.

These alignment parts in a preferred embodiment are integrally molded parallel pins on one piece and molded holes properly positioned to snugly receive the pins.

Finally, at least one connection means engages opposed points on the pieces intermediate the edges to hold those pieces together. Typically, this connection means is one or more screws and integral structures such bosses cast on the body part internally at the hollow to receive and guide each screw in one piece and direct it to engage a threaded hole on the other piece. When the screw or screws are tightened they pull the pieces together. Such an arrangement of pieces conveniently permits construction of the skeleton or mannequin such that when the pieces are assembled, the appropriate joint flange for that bone or part can be put into position and held there as the pieces are tightened together. The pieces themselves and the joint flange, if desired, may be glued to aid in holding the structure together.

More specifically, the present invention relates to a simulated skeleton comprising pieces representing collectively the various bone groups of each of the hands and feet; the pelvis and lower spine; and the rib cage, shoulders, upper spine and neck bones. Unitary pieces represent bones or groups of bones, including upper and lower arm bones and upper and lower leg bones in the skeleton. Connections are provided between various bones allowing relative rotation between connected parts. Connections include a pair of relatively rotatable radially toothed members each connected to a bone simulating piece. Means are provided defining an axis about which each toothed member rotates but which permit linear axial movement to allow the interfitting teeth of the toothed members to engage each other and restrain the pieces against relative rotation. Resilient means urge the pieces together but yield to rotational forces which drive apart the toothed members to permit rotation.

THE DRAWINGS

FIG. 7 is an exploded view of an alternative structure useful for smaller joints.

FIG. 8 is an exploded view of a somewhat modified structure similar to that of FIG. 7.

DETAILED DESCRIPTION OF THE PREFERRED EMBODIMENT

Figure 1:
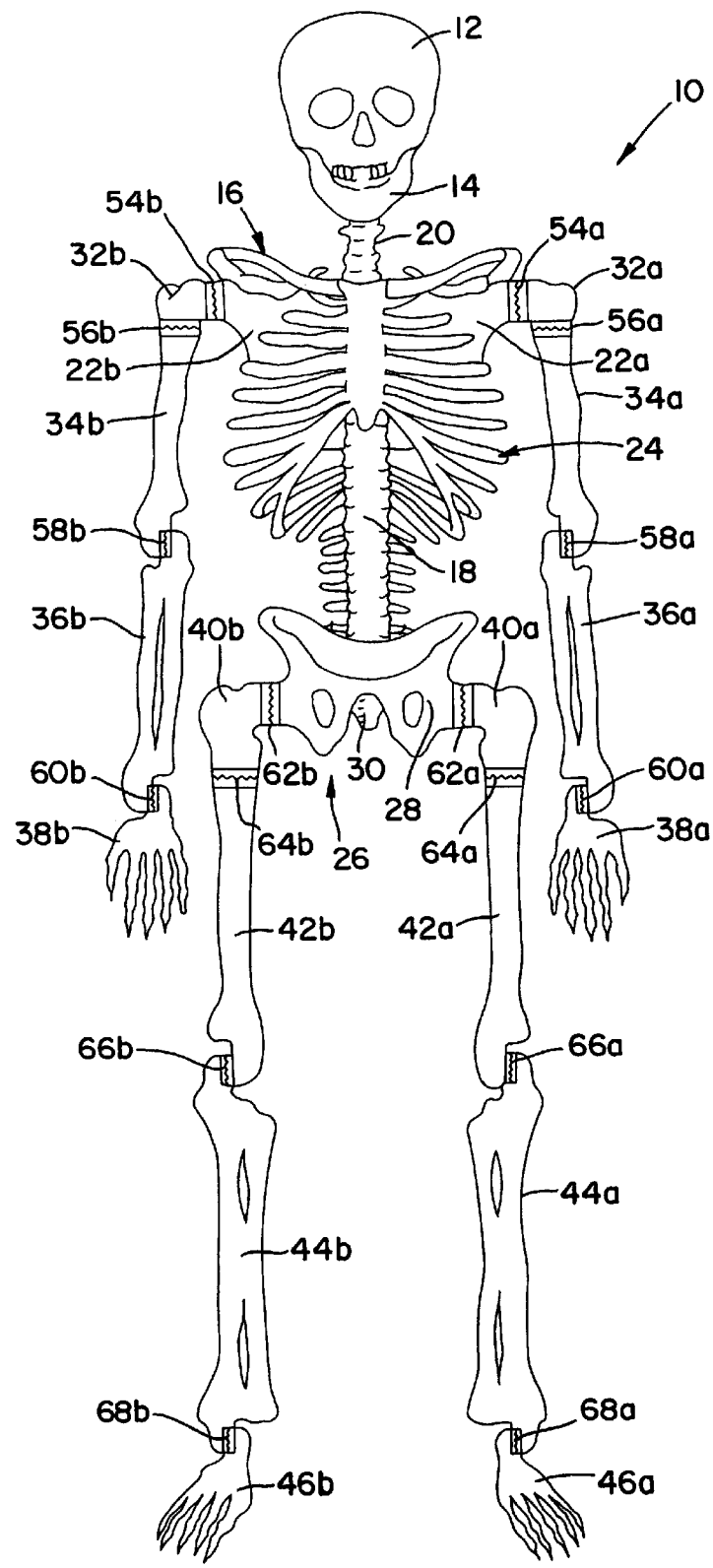
FIG. 1 is an elevational view of a posable simulated human skeleton according to the present invention.
Figure 2:
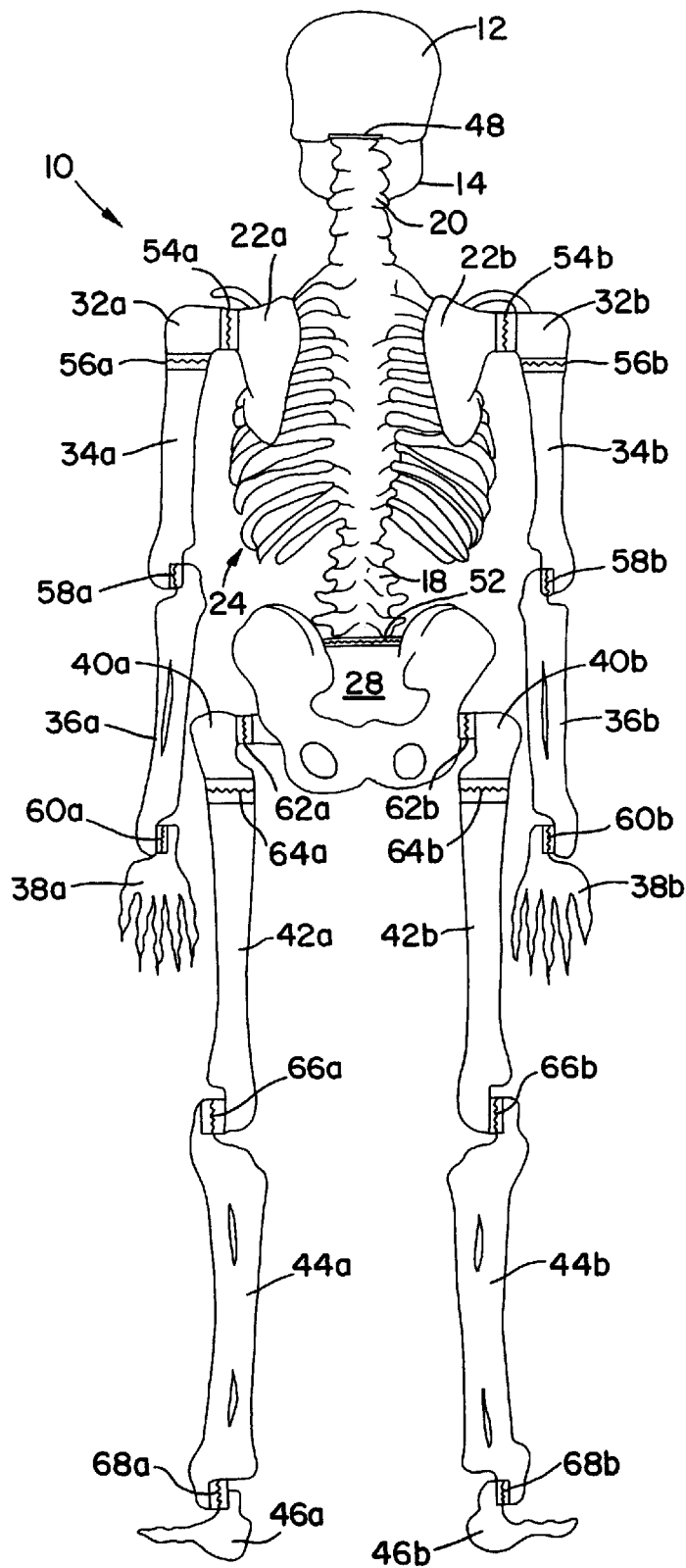
FIG. 2 is a back view of the same structure.

Referring to FIGS. 1–4 and particularly FIGS. 1 and 2, A posable skeleton generally designated 10 is shown. The pieces or bone masses shown are a head or skull 12, moveable lower jaw 14. An upper body portion, designated generally 16 includes the spine 18, the neck 20, shoulderblades 22a and 22b, and the rib cage 24. The lower body portion, generally designated 26, includes pelvis 28 and lower spine 30.

The skull 12 is attached to the upper body portion 24 by means of a joint 48 (visible in FIG. 2) which permits rotational movement between the head and body. The lower jaw may be made of resilient plastic that is deformable sufficiently to allow pins to be popped into place; friction of the lower jaw on the skull then holds the pieces in the closed mouth position of FIG. 3, or the open mouth position of FIG. 4, or in some intermediate position. The upper body 16 is connected to lower body 26 by another rotational joint 52 between pelvis 28 and spine 18.

Attached to shoulder blades 22a and 22b by rotatable joints 54a and 54b are non-anatomical pieces referred to herein as "shoulder bones" 32a and 32b. Shoulder bones 32a and 32b are, in turn, attached to upper arms 34a and 34b by rotational joints 56a and 56b which are in planes of rotation generally normal to those of joints 54a and 54b. Use of the shoulder bones and joints at or at least close to right angles allows much of the desired positionability of the arm.

Lower arms 36a and 36b are attached to upper arms 34a and 34b respectively by joints 58a and 58b. Hands 38a and 38b are attached to lower arms 36a and 36b respectively by rotational joints 60a and 60b which are in planes of rotation parallel to joints 58a and 58b and 54a and 54b.

Hip bones 40a and 40b are respectively attached to pelvis 28 by rotatable joints 62a and 62b which are generally parallel to one another. Non-anatomical "hips" 40a and 40b, in turn, are connected to the upper leg bones 42a and 42b, respectively, by rotatable joints 64a and 64b in planes of rotation generally perpendicular to those of joints 62a and 62b. As in the case of the arms the use of the "hip" and the two joints at approximately right angles to one another enables much of the positionability of the legs. The lower leg bones 42a and 42b, respectively, are attached to the upper leg bones 42a and 42b at joints 66a and 66b. The feet 46a and 46b are attached to the lower leg bones 44a and 44b by rotatable joints 68a and 68b. It will be observed that joints 68a and 68b and 66a and 66b are in planes of rotation generally parallel to one another and parallel to the plane of rotation of joints 62a and 62b.

Figure 3:
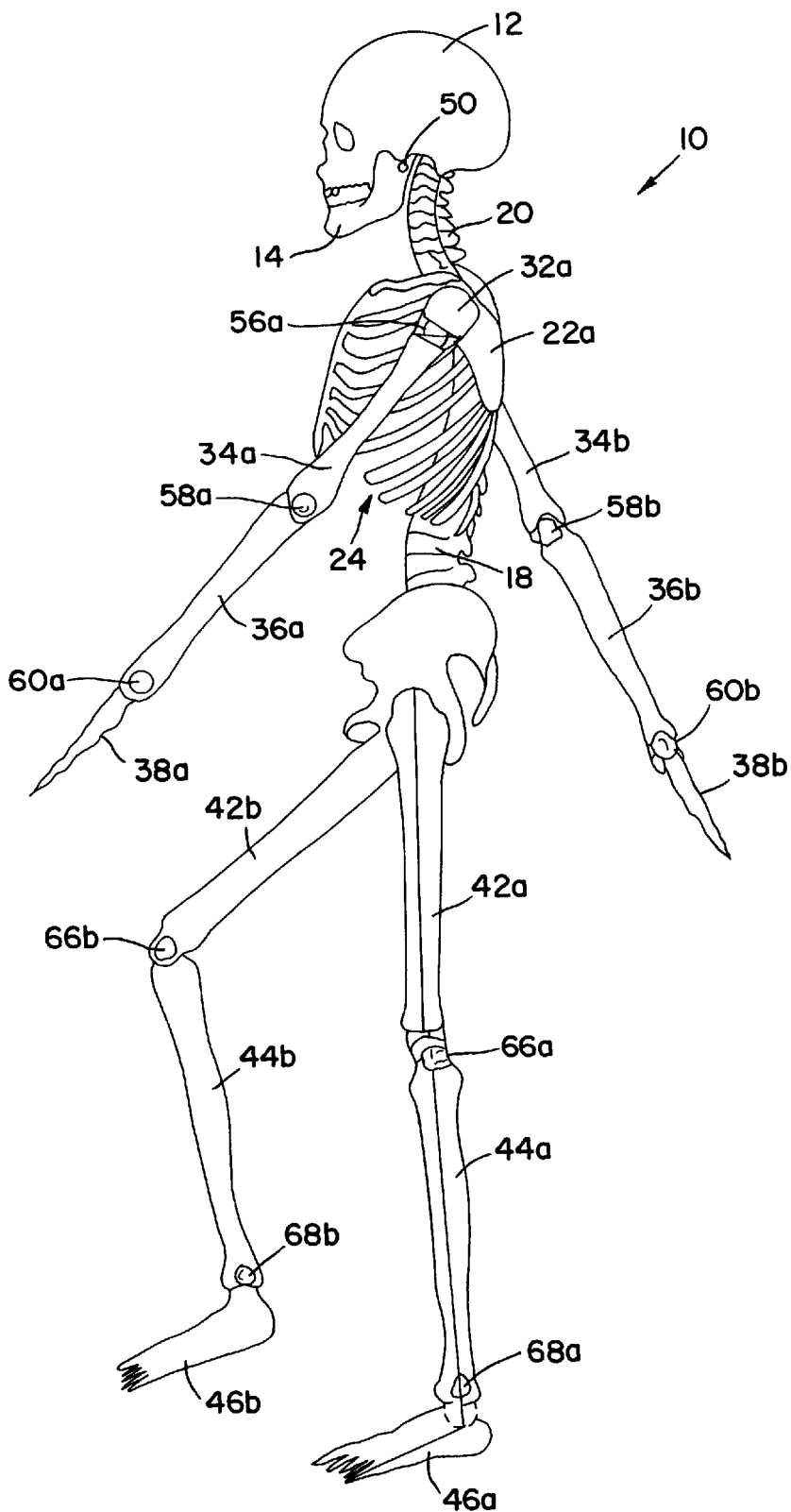
FIG. 3 is a side view of the structure with the arms and one leg repositioned to simulate a walking pose.

In the posed position of the simulated skeleton shown in FIG. 3, arm bones 34b and 36b together are rotated about joint 54b in a backward direction, arm bones 34a and 36a together are rotated in the forward direction around joint 54a. To achieve the effect shown none of the other joints of the arms is rotated.

Figure 4:
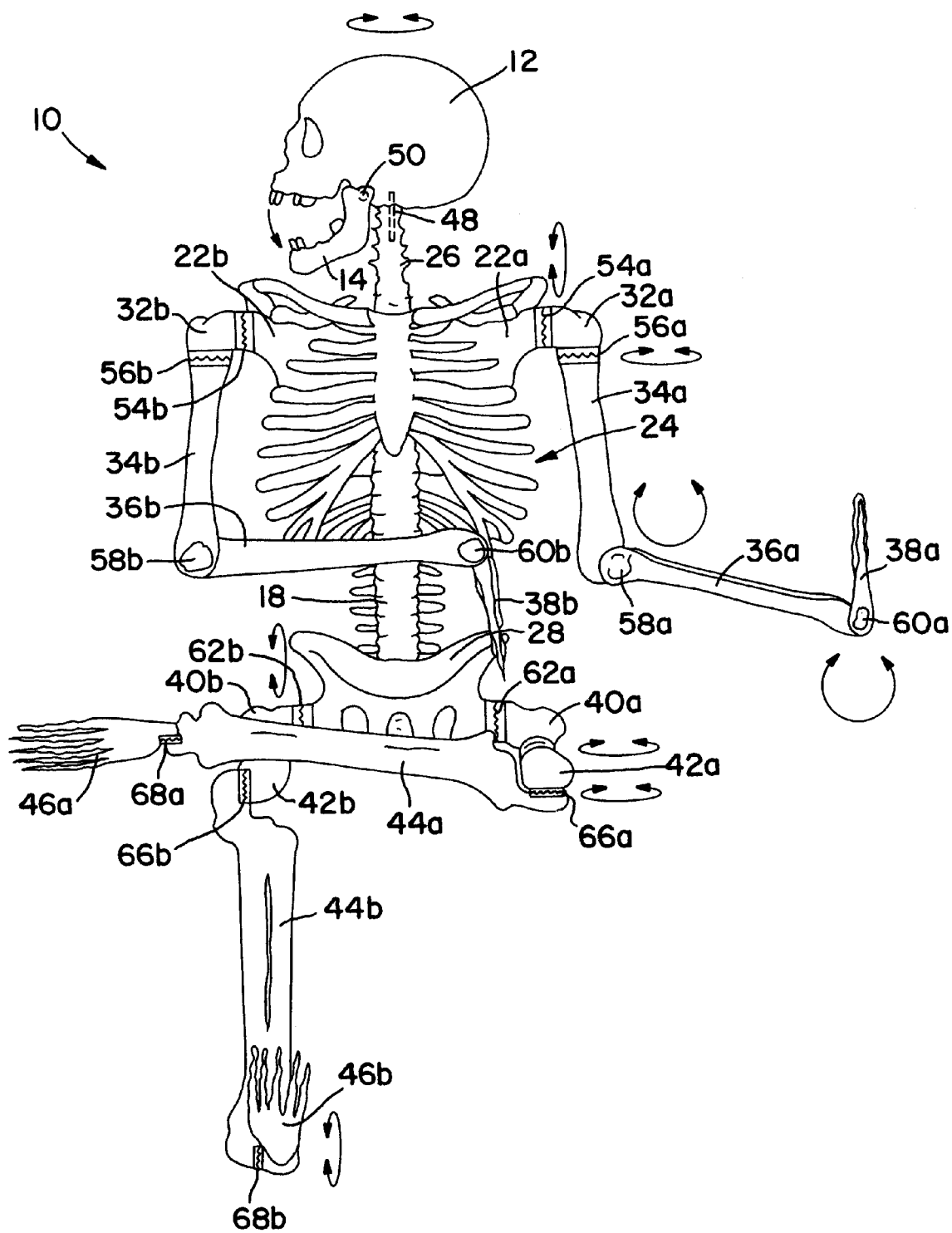
FIG. 4 is a front elevational view with various joints moved to simulate the posable skeleton in a seated position with one leg crossed over the other.

Right leg bones 42a and 44a and foot bone 46a remain the same as illustrated in FIGS. 1 and 2, but upper leg 42b is rotated forward about joint 62b and lower leg 44b is rotated back from upper leg 42b about joint 66b to achieve the pose shown in FIG. 4.

Skull 12 is rotated relative to neck 20 about joint 48. Lower jaw 14 rotates about pins 50 relative to skull 12. The shoulder 32b is rotated about joint 54b with respect to shoulder blade 22b and lower arm 36b is rotated about joint 58b relative to upper arm 34b about joint 58b to achieve the bend at the elbow. Upper arm 34b is rotated about joint 56b relative to shoulder 32b to place the bent arm in front of the ribs. The hand 38b is rotated about joint 60b to achieve the position shown.

The left arm is moved by rotating shoulder 32a relative to shoulder blade 22a about rotatable joint 54a to move the whole arm forward. Upper arm 34a is rotated relative to shoulder 32a, about joint 56a. Then lower arm 36a is rotated about joint 58a relative to upper arm 34a to achieve the bend at the elbow. Hand 38a is rotated about joint 60a to achieve the wrist flex shown relative to lower arm 36.

The upper right leg 42b is moved to horizontal by rotation of the hip 40b about joint 62b relating to the pelvis 28. Lower leg 44b is then bent downward around joint 66b relative to upper leg 42b as shown and the foot 46 can be moved about joint 68b relative to lower leg 44b to elevate it slightly from the floor so that it appears that the heel is resting on the floor and the toe is elevated.

The left leg is then is moved into horizontal position by rotating hip bone 40a relative to the pelvis 28 around joint 62a. In this case upper leg 42a is rotated relative to the hip 40a about the joint 64a so that it will then be possible to move the lower leg 44a inward and above the upper right leg 42b by rotation about joint 66a between lower leg 44a and upper leg 42a. The left foot 46a may be adjusted relative to the lower leg 44a about joint 68a as desired.

Figure 5:
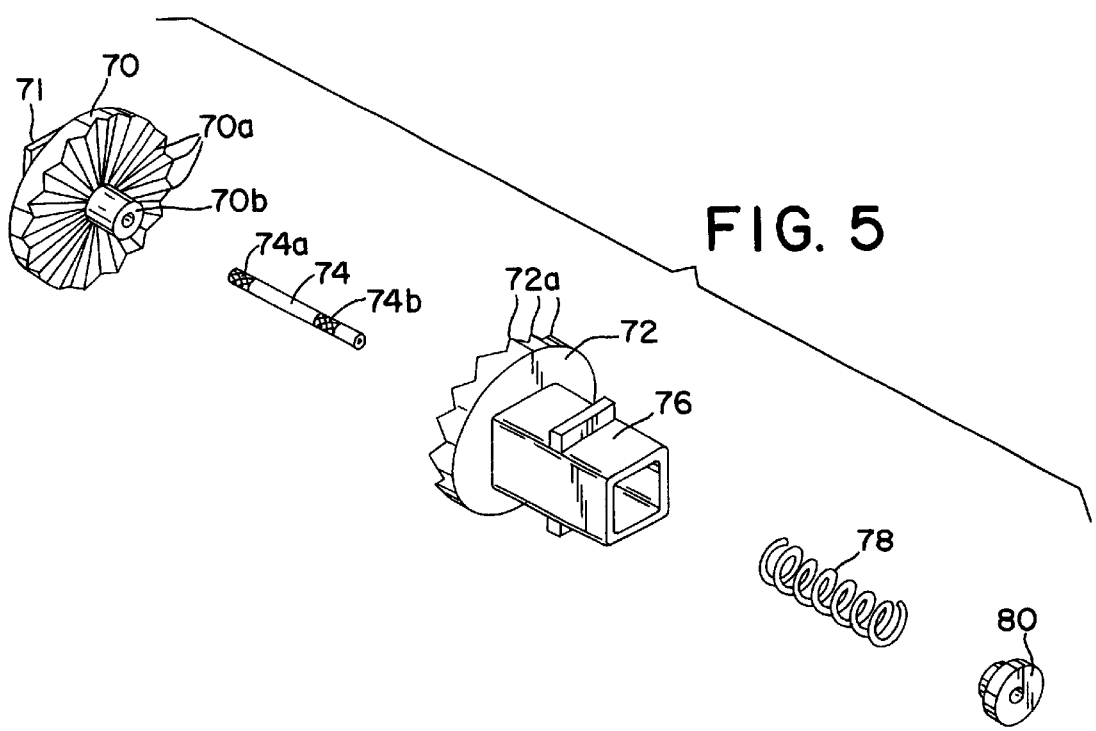
FIG. 5 is an exploded view of one version of a joint structure in accordance with the invention.
Figure 6:
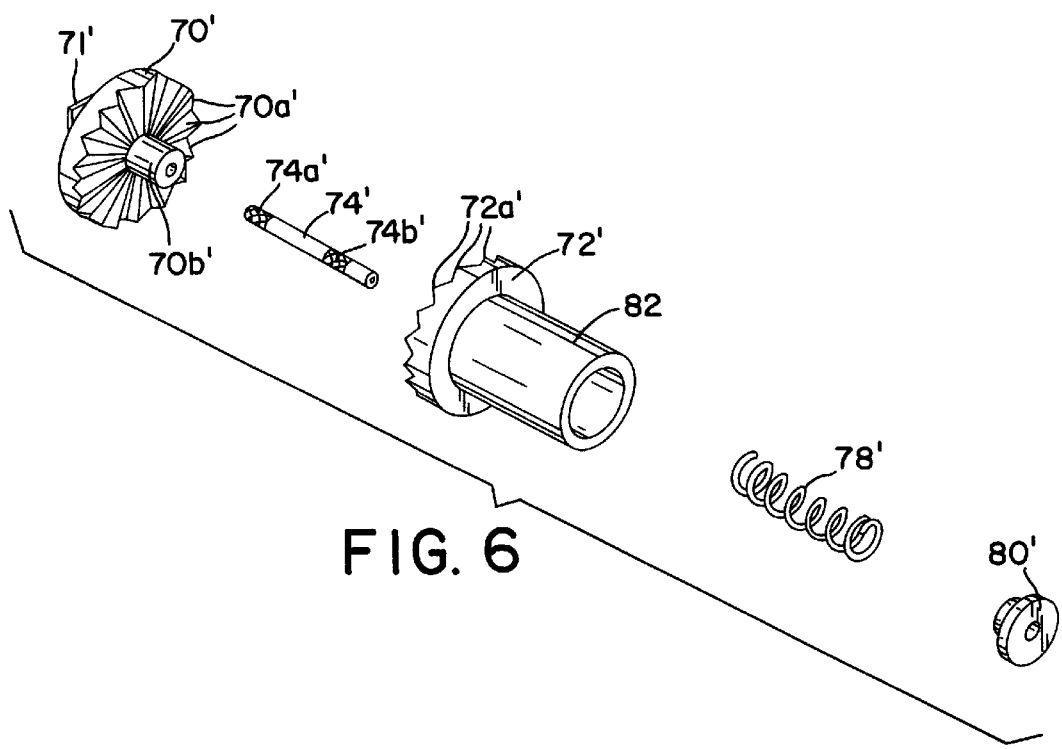
FIG. 6 is similar view of another structure similar to that of FIG. 5.

FIGS. 5 and 6 show slightly different versions of relatively heavy duty rotational joints used for shoulder and upper arm joints 54a, 54b, 56a, 56b and upper leg joints 62a, 62b, 64a, 64b. In FIG. 5 each joint has two interfitting toothed member 70 and 72. These members may be mechanically attached to and become part of the simulated bone structure by some kind of mechanical attachment or by gluing or by casting them integrally with the piece for which they provide the joint, or both. Generally radially directed, tapered teeth 70a, 72a are made to interfit in a symmetrical arrangement about the axis of member 70, An integral tubular extension 70b of member 70 is coaxial with the structure and is snugly received within an axial bore (not shown) through member 72 to be linearly slidably along the axis of rotation. An axial rod 74 has spaced knurled areas 74a and 74b. The knurled area 74a at the end of the rod may be press fit into the bore of tubular member 70b and essentially becomes part of that structure. The rod 74 is then placed through the axial bore of member 72 and extends into a square coaxial tubular support extension 76 which preferably is integrally molded with member 72. Spring 78 is next placed over the rod 74. Then stop shoulder disc 80 is placed over the end of the rod and press fit over the knurled area 74b, thus compressing spring 78 and urging it into the backside of member 72. The spring pressure urges toothed member 72 toward and into engagement with toothed member 70. The teeth 70a and 72a of each toothed member are triangular in section and made to interfit in many discrete positions. If they do not immediately achieve a proper position, their shapes will cause the teeth to slide along one another under pressure of spring 78 until they do interfit. In order to change position rotationally, the members attached to members 72 and 70 may be pulled apart, disengaging the teeth, and rotated to new positions. Alternatively by relative rotation of members 72 and 78 the teeth in opposition to the spring, will urge them apart and they can be repositioned to a desired location. The teeth permit moving the toothed members relative to one another without consciously pulling the toothed members apart because the triangular teeth provide ramps over which the opposed teeth can rachet to move the members apart as they are rotated relative to one another. Once a desired position is achieved, the pieces under pressure of the spring assume and remain in a stable position.

FIG. 6 shows a similar joint structure wherein the similar parts are given similar designation members with the addition of primes thereto. The main difference is that the integral coaxial tubular support extension 76 in FIG. 5 now has become a round tube 82 instead of the square tube 76. Member 70 also carries an integral molded support flange structure 71.

Referring now to FIGS. 7 and 8 two similar structures are shown which involve the smaller, lighter weight joints and rotatable positioning means used at joints 58a and 58b, and 60a and 60b in the arms and 66a and 66b and 68a and 68b in the legs. Toothed members 84 and 86 of FIG. 7 each have a ring of similar axially symmetrically arranged interfitting teeth 84a and 86a in large equal diameter rings. The teeth preferably are triangular in cross section and engage each other and otherwise operate as those of the structures of FIGS. 5 and 6. In FIG. 5, the toothed members 84 and 86 are provided with integral support flanges 88 and 90 which may be cast as one piece with the toothed member or otherwise made mechanically integral with those structures. Support flanges are used in mounting or mechanically affixing the rotatable joint members to the respective bone structures of which they become a fixed part. The toothed members are connected to one another by cooperative fasteners 92a and 92b which interengage to hold the pieces together. Together they provide an axial connecting rod about which at least one or both are rotatable. The members fixed together by the fasteners may include a lock washer 94 which tends to hold member 84 against rotation relative to the fastener 92b and therefore the axis of rotation.

FIG. 8 shows a smaller similar structure to that of FIG. 7 in which corresponding parts are given similar numerical indicators with the addition of primes. In the joints of both FIGS. 7 and 8 the resilience of the plastic from which parts are molded allows relative rotation of the shallower teeth. Alternatively a resilient washer or spring can provide additional axial movement.

Other means of attachment permitting relative rotation but not significant axial movement may be employed at the joints can be employed. One such alternative is used in joints, such as 48 between the skull 12 and the neck 20 and joint 50 between the pelvis 28 and the spine 18. Of course, many varieties of joints are possible to use. However, those of FIGS. 5, 6, 7 and 8 provide the advantage of reliably maintaining their positions once set. These joints have also proved to be durable and easily adjusted.

In addition to variations in joints, the bone distribution in a posable skeleton and the use of more or fewer joints for additional effects or for reduced cost are intended to be within the scope of the invention. Other skeletons such as those of animals and figures of humans and other creatures, other than skeletons, may be made with similar types of joints and are intended to be within the scope of the invention as are all structures within the scope of the claims. Also simulated bone construction using molded parts, preferably hollow and with joining features similar to those described herein are intended to be within the scope of the invention.

FIGS. 9–15 show in some detail pieces that make up the posable, simulated skeleton of FIGS. 1–4. While in some embodiments it might be conceivable to cast solid bone pieces, the additional weight of those pieces would make the assembled skeleton considerably less easy to handle and impose practical problems since, as will be discussed below, most joints have to be fixed in place by assembly of bone pieces. As a practical matter it is simple to make the skeleton, or other articulated figures, using hollow pieces which are provided with alignment pieces that aid in assembly and enable a structure which can be put together by screws. Although gluing, in addition to the screws, may be needed for permanent assembly. Use of screws can also facilitate disassembly for temporarily assembled parts, if necessary. Plastic molding techniques exist for making relatively thin durable parts of plastic materials.

Figure 9:
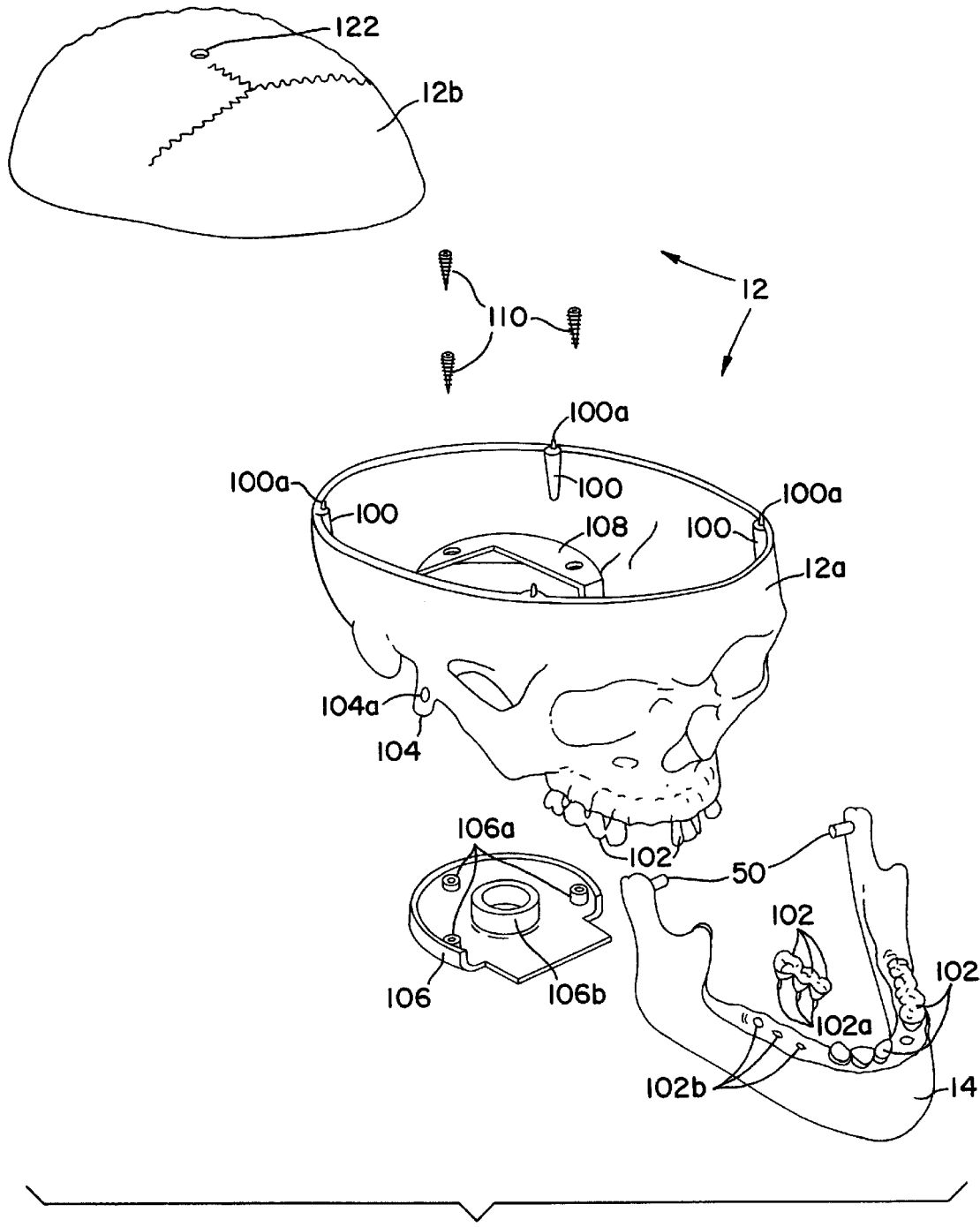
FIG. 9 is an exploded perspective view of parts making up the skull.

Considering now the assembly of the parts and the whole of the skeleton, reference is made first to FIG. 9. It will be seen that the skull 12 can be made in two pieces with an additional structural pieces for closing the bottom of the skull and facilitating attachment of the upper spinal cord. The cap portion 12b of the upper skull can be precision molded and arranged to fit on the precision molded lower part of the skull 12a by providing integral molded bosses 100, or thickened wall portions supporting parallel alignment pins 100a on the lower skull portion 12a around the periphery. The pins 100a in turn, engage precision molded alignment holes also preferably in bosses or thickened areas of the periphery in similar positions around the skull cap 12b. These skull pieces may be assembled at the very end of the assembly using the pins and holes for alignment around the periphery for permanent attachment of parts 12a and 12b, and suitable glue may also be used if desired. Likewise groups of teeth 102 may be cast together and provided with pin ends 102a that fit in both skull piece 12a and lower jaw 14 within holes 102b to which the pins 102a may glued. The lower jaw 14 is attached to the lower skull part 12a as previously described using integrally molded pins 50. The resilience of the jaw permits pulling the pins apart until they fit within the slots 104a on specially provided support flanges 104 on skull part 12a. Closure plate 106 is separately cast from the skull and attaches to pieces 108 molded as part of the lower skull 12a using screws 110 which fit into holes within screw receiving bosses 106a for proper positioning and alignment of the skull with the neck.

A collar flange 106b (FIG. 9) in plate 106 receives and holds in proper position a hollow cylindrical connection extension 112 of diameter to snugly but rotatably engage neck portion 20 extending upward of the neck portion 20 of the spine. The hollow neck pieces 20a and 20b of the neck portion 20 of the spine and the pieces of connector extension 112a and 112b are additionally connected together by screws 114 and 116 which are guided and supported in tubular bosses 112c and 118a in parts 112a and 112a, respectively. Aligned screw receiving tubular bosses (not shown) inside extension piece 112b and neck spinal portion 20b with which the respective screws can engage the screws so that when tightened the screws hold pieces together.

If desired, the skeleton may be hung from above to a hook or other support using a loop of cord 120 which is tied in knot 120a, placed within the cylindrical extension 112 and passes through hole 112c so that the knot engages under the top wall 112d which holds it in place and supports the skeleton. When the cylindrical piece 112 is inserted through collar 106b, the loop can extend ultimately upward and through hole 122 (FIG. 9) in the skull cap 12b when that piece is finally finished. Hanging the skeleton in this way permits the illusion of an airborne skeleton, which is actually suspended vertically by the loop 120 and can be appropriately positioned by adjustment at the joints into various desired positions.

It should be observed that the neck spinal section 20a is separate from the back spine section 30a. However, front spinal section 30b is an integral part of the molded spinal sections 18b and 20b. Screws are used to connect the front and back portions of the spinal parts. Screw 122 is representative of others that pass through a guide boss 118 and engage aligned screw receiving bosses in spinal section 18b. Portions 30a and 30b on the lower spinal section 30 also have aligned bosses to guide 126a and receive screws to connect parts of lower spinal cord 30.

Figure 10:
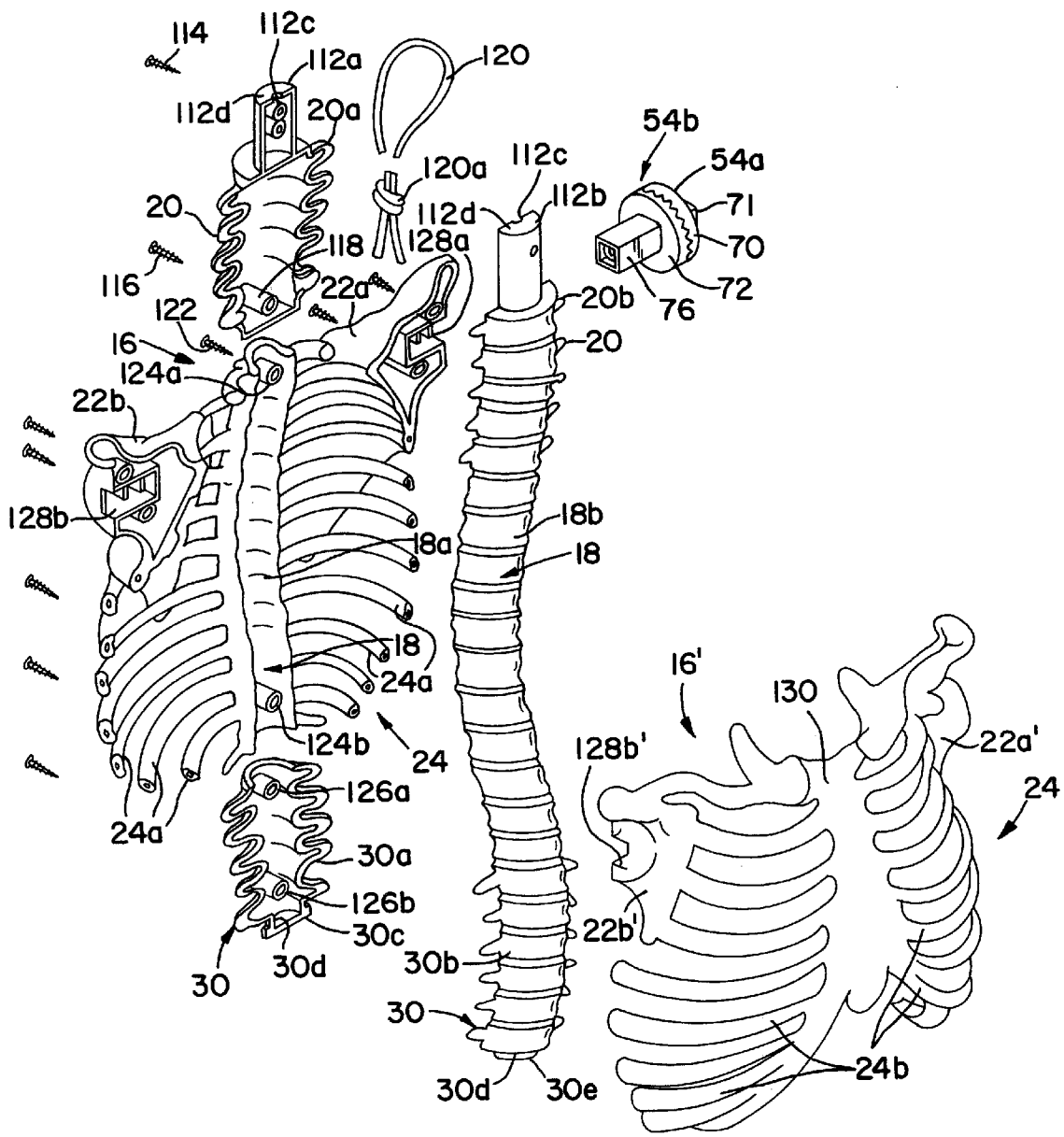
FIG. 10 is an exploded perspective view showing parts making up the upper torso of the skeleton.

Attached to the molded hollow spinal portion 18a are molded hollow shoulder blade portions 22a and 22b. These fit together with shoulder blade portions 22a' and 22b', which are molded integrally with the front molded part of the rib cage 16'. As can be seen in FIG. 10, molding the shoulder blades and rib cage parts separately allows joint supporting cavity 128b to be molded in shoulder blade portion completed within 22b and 22b' as cavity portion 128b'. These cavities are molded to exactly receive the square tube 76 of the precision joint structure shown in FIG. 5. Since the rib cage portions 24a and 24b are also divided with the rib cage portion 24a being attached to the spinal section 18a and the rib cage portion 24b being attached to the sternum 130.

Figure 11:
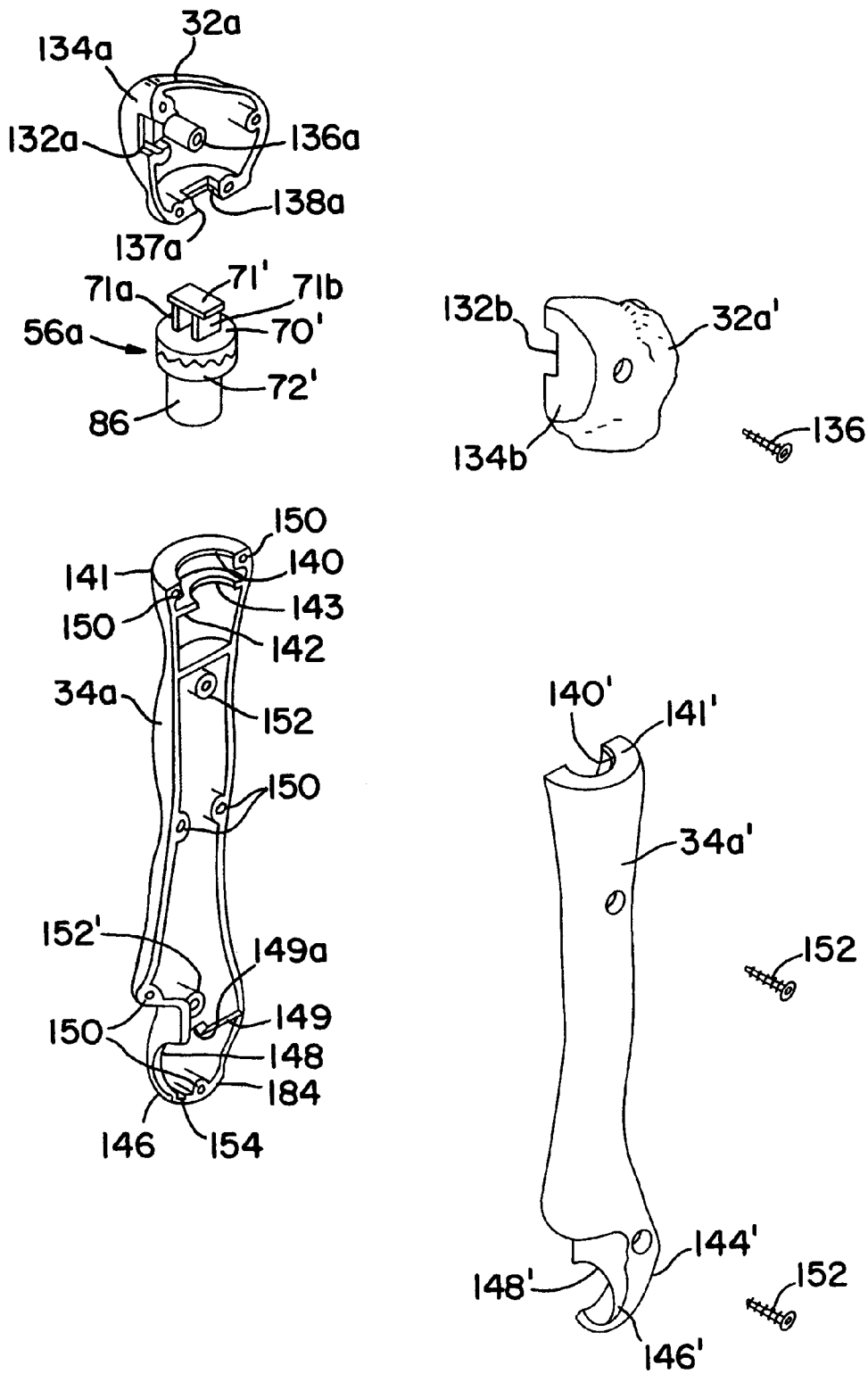
FIG. 11 is an exploded perspective view showing parts that make up the upper left arm of the skeleton.

Referring now to FIG. 11, parts of the shoulder and upper left arm are illustrated. The shoulder 32a is divided into hollow mating pieces 32a and 32a' as shown. Shoulder pieces 32a and 32b include a pair of molded mating cavities 132a and 132b (FIGS. 10 and 11) for supporting tubular extension 76 of toothed member 72 (FIG. 5) of joint 54b. The joint 54a, which employs the joint structure in FIG. 5, 76 having been engaged within the shoulder blade as described above extends toward the shoulder. As can be seen by the joint 56a, the molded flange and its support columns are cast integrally with piece 70 and look identical to the piece 70'. Other forms will occur to those skilled in the art, but this version includes a pair spacer columns which are flat rectangular pieces supporting a rectangular flanged piece overlapping the edges and ends of the spacer columns. The overlapping edges are engaged in groove or slots 132a and 132b in the respective shoulder pieces 32a and 32a'. Shoulder pieces 32a and 32a' are connected together by screw 136 which extends through a guide boss to an aligned threaded tubular boss 136a in shoulder part 32a which it engages. Flange 71' of joint 56a is engaged in much the same way with the column supports of flange 70' embraced within the rectangular opening 137a and the flange 71' engaged within the recessed groove 136a. Flange 71 of joint 54a, and flange 71' of joint 56a must be engaged at the same time and in the same way within a pair of opposed grooved cavities, one of which 138a is shown, so that the overlapping edges of the flange member 71' are held firmly in place. The flat back of toothed member 70 of joint 54a rests against the flat surfaces 134a and 134b and may be glued thereto. The same thing is true of the flat back of member 70' of joint 56a which rests against a flat bottom surface of shoulder pieces 32a and 32a'.

The upper arm is supported by the joint 56a from shoulder pieces 32a and 32a'. The integral round tubular portion 72' is embraced by conforming rounded apertures 140 and 140' and 143 and 143a in double walls 141, 141' and 142, 142'. The flat top wall 141, 141' affords an opportunity for gluing to the flat back of toothed member.

It will be understood that right and left arm structures are preferably the same but, of course, in mirror image of one another.

Figure 12:
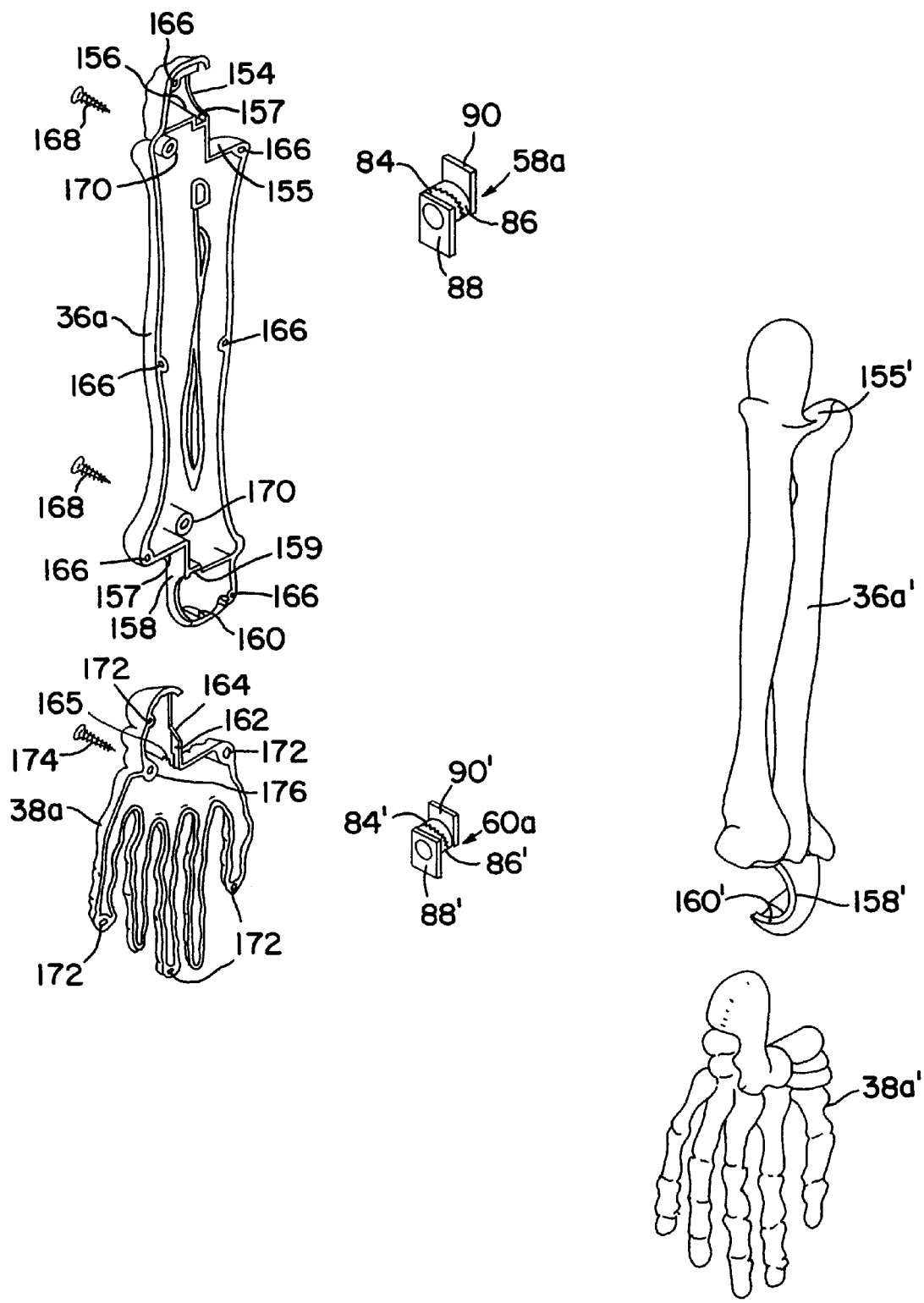
FIG. 12 is an exploded perspective view of parts that make up the lower left arm of the skeleton.
Figure 13:
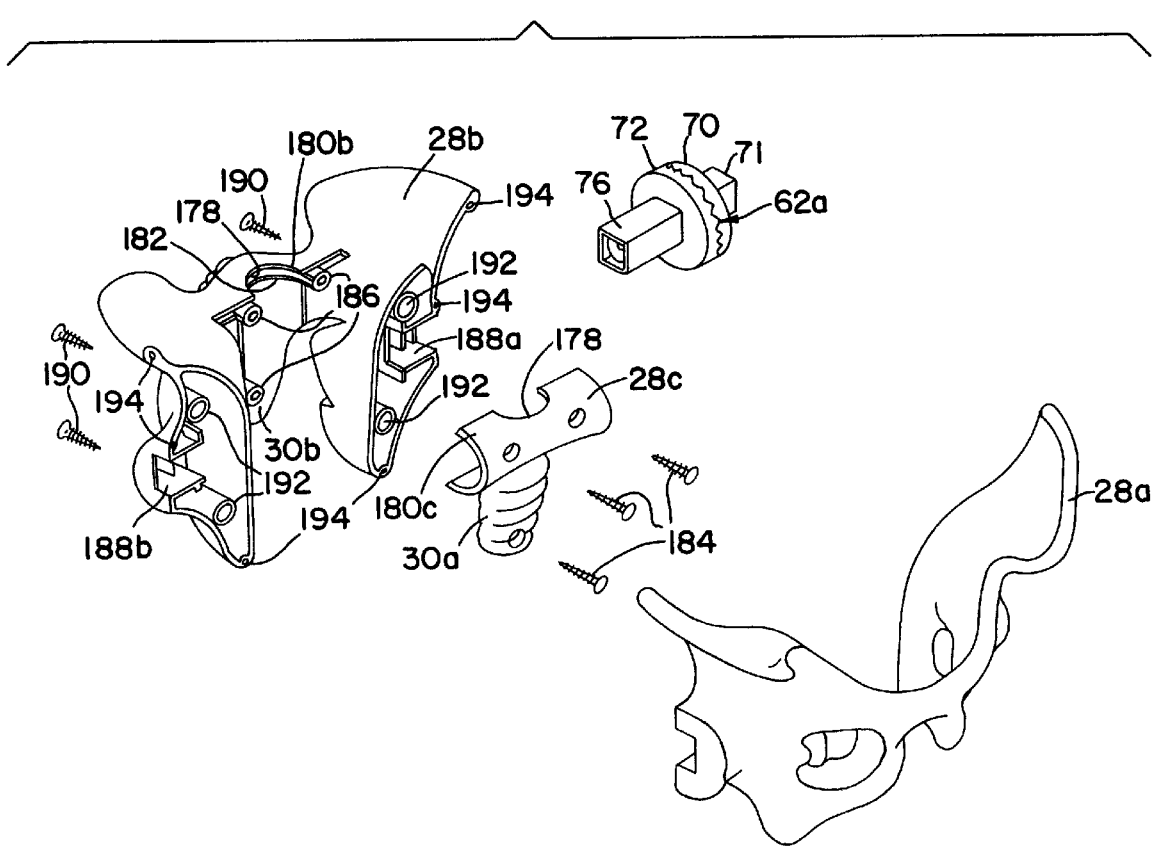
FIG. 13 is an exploded perspective view of parts that make up the pelvis and lower torso of the skeleton.

At the elbow end of arm 34a, 34a' the bone groups are extended about half way across the bone and partially closed by a flat wall 146, 146' generally aligned with and close to the long axis of the bone groups 34a, 34a'. A planar wall 147, 147' transverse to wall 146, 146' closes the end of the bone pieces 34a, 34a'. These walls engage a joint 56a corresponding to the joint of FIG. 7. As seen in FIG. 11, cylindrical toothed members fit within conforming holes 148, 148' in walls 146, 146'. Wall 146, 146' is backed by grooves 149, part of which are formed by a wall 149a extending across the bone cavity. A bend 149a in wall 149 creates part of the flange retaining groove. The rest of the groove 157 is molded in behind wall 146. Joint 58a shown in FIGS. 7 and 12 is used between the upper and lower arm bone groups 23a, 24a', and 36a, 36a'. Toothed cylindrical member 86' fits in opening 154, 154' with its integral rectangular solid flange 90' held in the grooves 149 and 151, and may be glued in place. As the hollow bone parts 34a, 34a' are aligned with the joints 56a and 58a in place, integral molded parallel alignment pins of piece 34a' engage aligning holes 150 of upper arm piece 34a. Screws 152 are inserted through guide bosses in upper arm piece 34a' and enter aligned threaded holes in bosses 152' on upper arm bone piece 34a and are tightened to pull the pieces together.

Referring now to FIG. 12 there is illustrated two mating hollow molded pieces constituting lower arm bone group 36a, 36a', which has two non-anatomical extensions, one at each end. The one at the elbow is closed by traverse wall 155, 155' and planar wall 156, 156' parallel to planar wall 146, 146' which provides a hole 154 for closely confining cylindrical toothed member 84. When cylindrical member 84 is thus confined, its integrally molded flange 88 fits within groove 156, 156' immediately behind wall 158, 158' which conforms to the size and shape of flange 88 so that the toothed member 84 cannot rotate.

At the other end of the simulated lower arm bone group 36a, 36a' is a non-anatomical extension which presents a planar wall 158, 158' generally parallel to the axis of the bone group adjoining a transverse wall 157, 157'. The parallel wall provides a hole 160, 160' which embraces cylindrical toothed member 86' within the hole. The integral flange 90' of member 86' fits snugly within the groove 159 parallel to the planar wall 158, 158' so that the toothed member 86 cannot rotate relative to bone group 36a, 36a'.

The hollow lower arm bone group pieces 36a, 36a' are fixed together using guide hole 166 around the periphery of member 336a for receiving parallel alignment pins (not shown) opposite the holes on member 36a' to position the member relative to member 36a. The joints 58a and 60a are put in place before the lower arm members 36a, 36a' are closed. Screws 168 are guided through tubular bosses 170a on member 36a which direct screws into screw receiving threaded bosses in member 36a' and the screws are tightened to connect together the lower arm structure.

The left hand bone group is made up of mating hollow pieces 38a, 38a'. It also has a non-anatomical structural extension with a wall 162, 162' generally parallel to wall 158, 158' in the lower arm which provides hole 164, 164' in wall 162, 162' to embrace cylindrical toothed member 86'. The integral flange 88' is snugly engaged in a grove 165, 165' molded behind wall 162, 162' which prevents rotation of toothed cylindrical member 86' relative to the hand bone group.

Joint 60a is put in place when the hand bone group pieces 38a, 38a' are fixed together using guide holes 172 around the periphery of member 38a to receive aligned parallel guide pins (not shown) opposite the holes on member 38a' to position the members relative to one another to simulate the left hand bone group. Screw 174 is guided through tubular boss 170a on member 38a which direct screws into a screw receiving boss in member 38a' to connect together the left hand bone group pieces and clamp the joint 60a between them.

FIG. 10 shows in detail the pieces making up the simulated spine. The lumbar section 30 is terminated in a smaller diameter cylinder 30d with a radial circumferential flange 30e at its lower end. Cylinder 30d is sized to snugly engage the openings 178, 182 through double walled regions of pelvic pieces 28b, 28c. The double walled outside measurements determine the length of cylinder 30d so that the shoulder at the sacral region of the spine and the flange 30e prevent axial movement of the cylinder 30d and the lumbar section 30 of the spine, but do not restrict its rotation relative to the pelvis 28. This rotational movement allows positioning of the upper body relative to the spine. When the cylinder 30d is in place the pelvic molded piece 28c is secured to the pelvic molded piece 28b by three screws 184.

The screws pass through the molded piece 28c and the sacral spine termination 30a through guide bosses and are received within aligned tubular threaded guide bosses 186 on the sacral member 30b and pelvis piece 28b. Joints 62a and 62b and 64a and 64b for attaching the hips to the pelvis and the leg to the hip are the type shown in FIG. 5 having an integral square tubular extensions. The extensions 76 fit into mirror image receptacles 188a, 188b in the pelvis 28.

Since the legs are the same structure in mirror image, it is only necessary for understanding to consider one leg and hip. Considering the left leg structure, the left hip 40a (FIG. 14) which is connected to pelvis 28 (FIG. 13) by joint 62a by flange structure 71. The parallel walls 196, 198 providing a hole 143, 143' conforming to the outer diameter of tube 86 of the joint 56a. The tube may be glued in place or alternatively mechanically fixed in place. The hollow molded bone pieces have a non-anatomical form at each end to facilitate connection of the bone joints required.

The socket provided to receive joint 62a is formed partially on pelvic molding 28b and partially on pelvic molding 28a. The part of the socket 188a seen in member 28b, suffices to understand the construction, the two parts of the socket area snugly receiving receptacle for the tube 76 of joint 62. The molded pelvic pieces together provide a very snug fit for integral tubular piece 76 of cylindrical toothed member 72 of the joint 62a. Both the outer surface of the tube and the back flat surface of the toothed member 72 plus opposed receiving members include socket portion 188 may be glued to keep the pelvic parts 28a and 28b prepared with the joints 62a and 62b in place. Pelvic member 28b at its periphery provides guide holes 194 to receive parallel guide pins (not shown) at corresponding locations on member 28a which align the two pelvic pieces 28a, 28b properly relative to one another. A plurality of screws 190 which extend through guiding tubular bosses 192 into threaded bosses which receive the screws, which when tightened hold the 28a, 28b together.

Hip piece 40a (FIG. 14) has a further receptacle that receives the other flange members 71 of joint 64a between two aligned rectangular openings 196 and 196a in parallel walls 198 and 198a. The openings conform to the size and spacing of the support flanges 71a and 71b for flange 71. The support flanges are also the distance between the near and remote surfaces of the parallel walls so that flange 71 overlaps the inner surface of the inner wall 198a behind the square opening and flat surfaces 198 of the shoulder abut the flat surfaces 70 on cylindrical toothed member 70, preventing movement and facilitating application of glue as needed between those surfaces.

At the bottom of hip piece 40a' are another pair of parallel transverse walls 200 and 200a both of which are provided with aligned rectangular holes 202 and 202a which are also divided between the pieces providing the hip structure 40a to facilitate engagement of joint 64a, which in this case is the joint of FIG. 5. The supporting columns 71a, are embraced as close as possible within the dimension of the holes 202, 202a in the respective double walls 200, 200a. More specifically, the support columns 71a for flange 71 fit snugly within the confining holes 202, 202a. When the flange 71 of both joints 62a and 64a are properly engaged behind their respective inner walls 198a and 200a, the hip pieces 40a and 40a' are placed together. Facilitating alignment of the hip pieces 40a and 40a' are alignment holes 208 in piece 40a which receive parallel guidepins (not shown) positioned on corresponding points along the periphery of the opposing hip member 40a' to guide the two members together into proper positioning. The screw 204 is then fed through a guiding boss to engage the aligned tubular threaded receiving boss 206 on hip piece 40a and tightened to hold the hip pieces together and the joints within the hip pieces.

The upper leg bone is divided into opposed molded hollow pieces 42a and 42a' pieces which fit together as do other pieces of the skeleton. At the top end of the bone 42a, 42a' is a non-anatomical flat wall 210 parallel to wall 200 on the hip. Through wall 200 is provided a square opening 212 to snugly receive the integral square tube 76 on toothed member 72' of joint member 64a. The square tube extends well beyond the wall and in order to provide a secure anchoring for the tube, another parallel wall 214, transverse to the bone pieces 42a and 42a' is provided with a recess 216 sized to snugly receive the square tube 76 and hold it in position so that the flat backs of toothed member 72 abuts flat wall 210 and may be glued thereto. Glue may also be applied along tube 76 where it makes contact with the opening in its supporting walls.

The lower end of the bone 42a, 42a' is provided with a non-anatomical structure intended to facilitate the use of joint 66a, of the type of structure shown in FIG. 7. Both rotating toothed members 84 and 86 are integral parts of generally rectangular flanges 88 and 90, respectively. The bone castings 42a and 42a' provide an extension having a flat wall in a common plane generally parallel to the axis of the bone and having a circular hole 220 of a size to snugly receive the toothed member 84. Immediately behind the opening is a rectangular groove 220a which receives the rectangular flange 88 in a snug fit both as to thickness and peripheral size.

Once the joints 64a and 66a are in place the bone pieces 42a and 42a' may be put together. Alignment holes 222 along the periphering of bone piece 42a mate with aligned parallel pins molded on the edge of the bone piece 42a' so that when the two long pieces 42a and 42a' are brought together with the aligned pins inserted in the holes 222, they will be properly aligned. In that position, the screws 222 passing through guiding bosses 226 in piece 42a will engage aligned tubular threaded bosses on the other piece 42a' and pull the two pieces snugly together.

Figure 14:
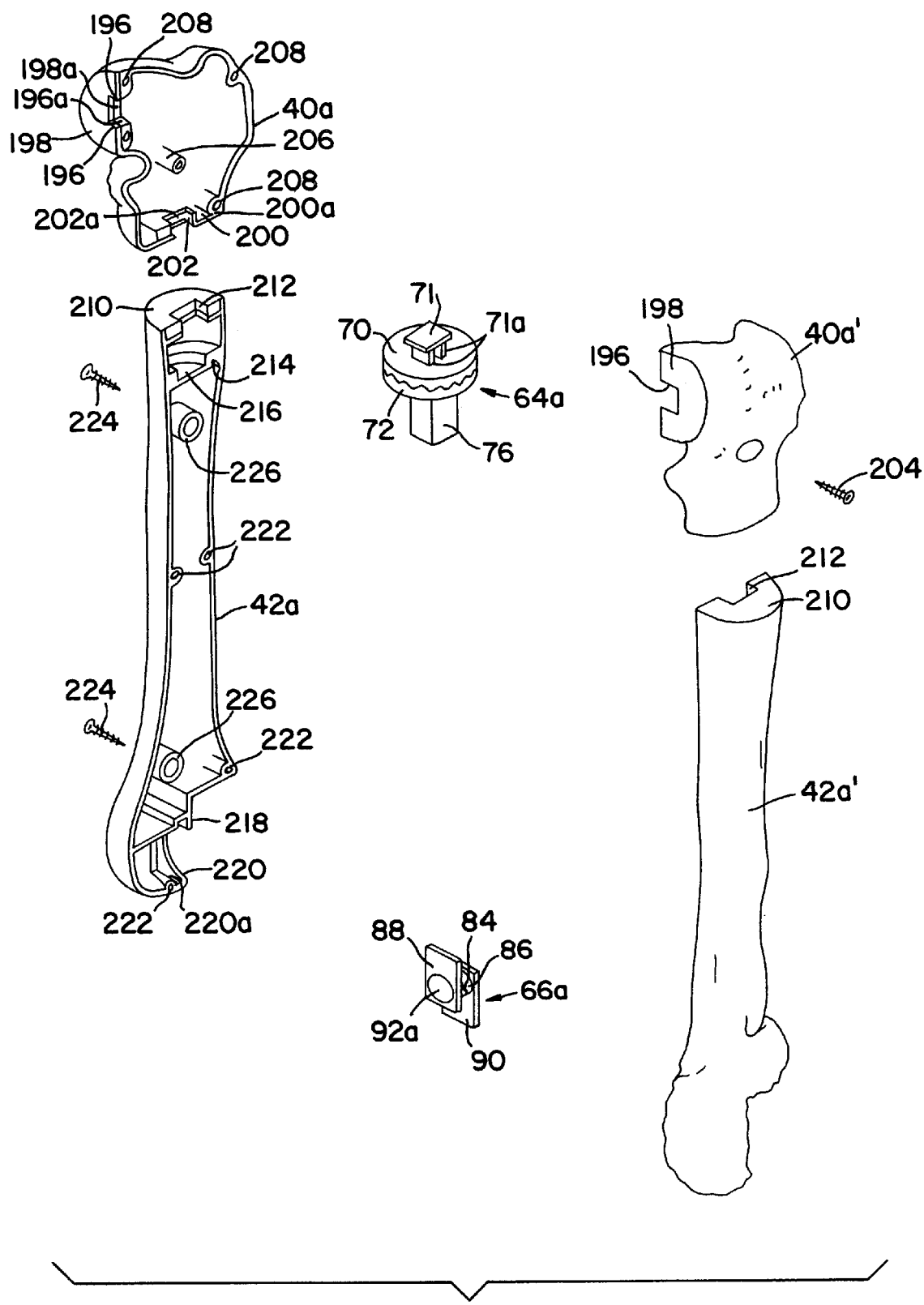
FIG. 14 is an exploded perspective view of parts that make up the upper left leg of the skeleton.
Figure 15:
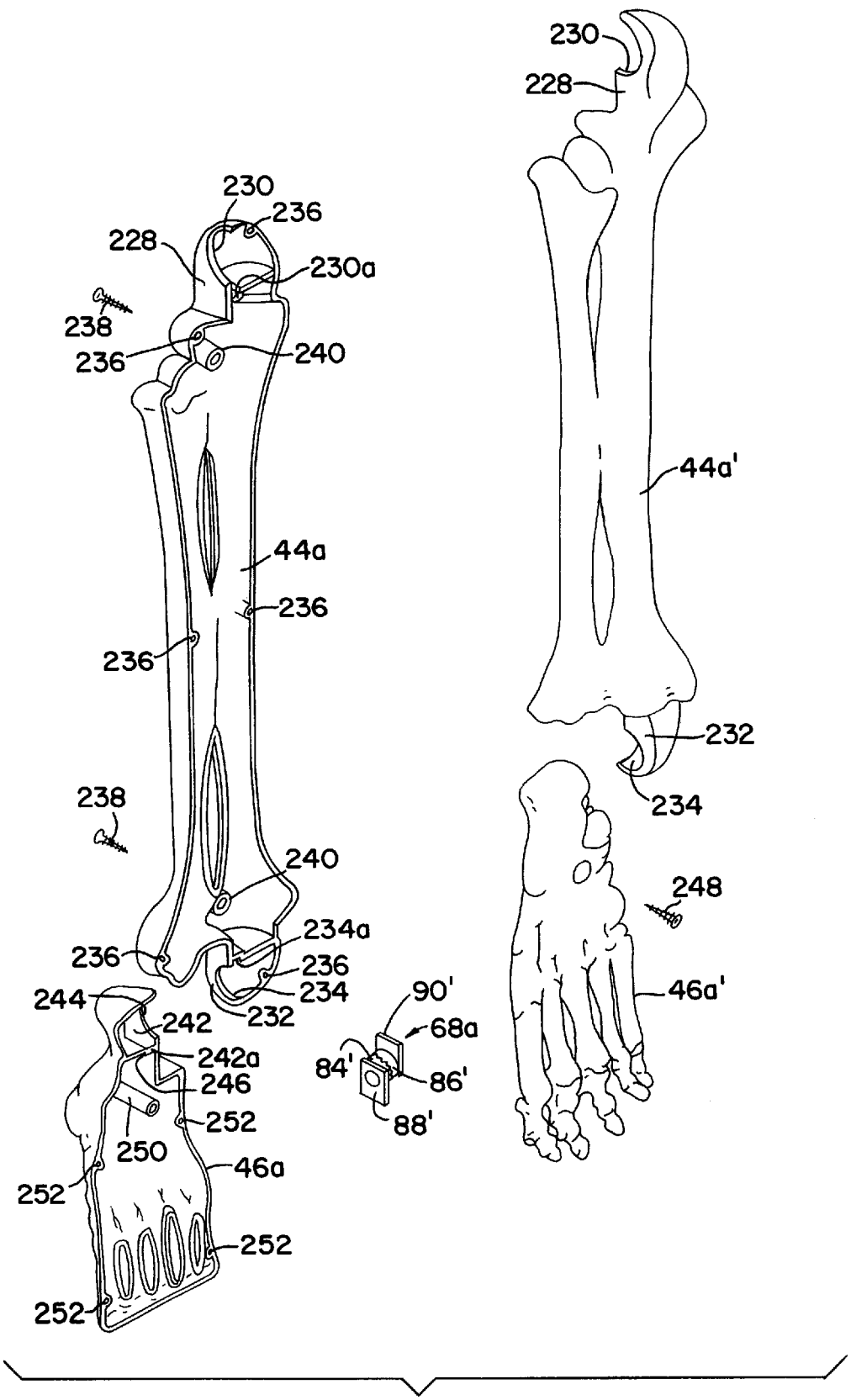
FIG. 15 is an exploded perspective view of various parts that make up the lower left leg of the skeleton.

Referring now to FIG. 15, it will be seen that the lower leg bone simulating group is made of mating hollow castings 44a and 44a' which molded pieces which fit together as with other skeletal pieces. The upper end of each of these pieces has a non-anatomical extension closed by a flat wall 228 which parallels flat surface 218 on bone pieces 42a, 42a' and permits connection by joint 66a (FIG. 14). Circular hole 230 in wall 228 receives cylindrical toothed member 86 snugly. Behind the hole is a rectangular recess 230a shaped and sized to receive snugly flange 90 which is molded integrally with the toothed member 86 of the joint 66a shown in FIG. 14 and holds the toothed member from rotation relative to bone pieces 44a, 44a'. At the opposite end of the hollow bone pieces 44a, 44a' a further extension of the bone provides a flat wall 232, generally parallel to wall 228 and to the axis of the bone group 44a, 44a' which wall extends across and closes the extension on each of the pieces. A hole 234 in wall 232 is made to snugly embrace the toothed member 86' of joint 68a. Joint 68a is of the type shown in FIG. 8. Behind the hole a groove is sized to snugly receive the integral flange 90' so that it will not move relative to the bone pieces 44a, 44a' while snugly accommodating and position its cylindrical toothed member 86 through the circular opening 234.

With the joint 66a and 68a, respectively, firmly in place, the pieces of the lower leg 44a are assembled. As in other bone simulating castings, there are small guideholes 236 distributed around the periphery of piece 44a. Parallel pins cast on member 44a' are positioned to engage the holes to assure that the pieces 44a and 44a' are properly aligned and the joint members are properly held in place. At this stage screws 238 are introduced through guide bosses 240 on piece 44a to engage aligned threaded tubular bosses into which they thread in member 44a and are tightened to hold the structures 44a, 44a' together and the joints 66a and 68a in place.

Finally, the hollow molded pieces 46a and 46a' simulating the various bones collectively in the left foot are connected together. The heel area of each piece is provided with a non-anatomical extension which extensions together provide a wall 242 parallel to wall 232 on bone group 44a, 44a'. Through this wall is provided a circular opening 244 of a size to snugly accommodate cylindrical toothed member 84 of joint 68a. Molded parts 46a and 46a' provide a groove 246 parallel to wall 242 conforming in shape and size to the integral rectangular flange 88' to snugly accommodate it when foot portions 46a and 46a' are placed together, thus securing the foot bone group 46a, 46a' to the lower leg bone group 44a, 44a' by joint by joint 68a in a manner permitting relative rotation about relatively horizontal axis. The pieces are assured of proper position by the integral parallel alignment pins 252 around the periphery of foot piece 46a which are arranged to enter similarly positioned holes on foot piece 46a' to assure proper relative positioning. When the pieces of the joint are in place the pieces of the foot 46a and 46a' may be assembled together using screw 248 which passes through a tubular guide member in foot piece 46a to engage tubular threaded boss 250 on foot piece 46a' and tightened to pull the pieces together and engage joint 68a.

What is claimed is:

1. A simulated posable skeleton comprising:
   a. bones and bone groups simulating a human skeleton, the bone groups defining leg limbs and arm limbs, and a body,
   b. joints connecting said bones and bone groups so that the connected bones and bone groups are able to be moved rotatably relative to one another, the joints distributed in the arm limbs and leg limbs, respectively, so that each limb has two joints remote from the body, one respective arm and leg limb joint having an axis of rotation which remains generally parallel to the other remote arm and leg limb joint, a third joint connecting each of the arm and leg limbs to the body, and a fourth joint positioned between the third joint and the other two joints, the fourth joint having an axis transverse to the third joint, the combination of joints in each of the limbs enabling the positioning of the bones and bone groups to simulate human postures, and
   c. positioning means located at each of the four joints on each limb which enables the bones and bone groups to maintain selected positions, the positioning means comprising
      opposed toothed members each having opposed radially arranged interfitting teeth, the teeth shaped to inhibit rotation when engaged together and to permit rotation under rotational force applied to the bone or bone groups to which the toothed members are rigidly affixed,
      means to provide axial support and connection of the members, and
      means resiliently urging the toothed members together such that the members are axially yieldable to permit relative rotation.

2. The simulated posable skeleton of claim 1, in which each of the toothed members of the joint is provided with integral means for rigid attachment to the supporting bone or bone groups to which it is attached.

3. The simulated posable skeleton of claim 2, in which each bone or bone group which receives the rigid attachment means has a cavity corresponding to such integral attachment means.

4. The simulated posable skeleton of claim 3, in which the bone or bone group members which receive the attachment means are hollow separable pieces which receive the attachment means within mating cavities shaped to conform to the attachment means and hold said means and its supported toothed members rigidly relative to the bone or bone group.

5. In a simulated skeleton for an animal figure, such as a human figure, a joint comprising:
   a. two relatively movable body parts, each body part having an opposed toothed joint member which engage one another and which include radially directed interfitting teeth, the teeth inhibiting rotation when the toothed members are engaged together while permitting rotation under rotational force to the body part, the rotational force moving the toothed members axially away from the other, b. means to assure axial alignment of the toothed joint members, and c. means resiliently urging the teeth together such that the members are axially yieldable with respect to one another to permit relative rotation.

6. The joint of claim 5, in which the urging means allows limited relative axial movement so as to permit the toothed members to move apart and to assure correct alignment when the teeth are urged back together.

7. The joint of claim 6, further comprising an axially oriented tubular protrusion on one of the toothed members and an accommodating axial bore on the other member.

8. The joint of claim 5, further comprising an axial rod fixed to one toothed members and slidably extends through the other and is terminated beyond the other member in shoulders, and the urging means comprises a compressed spring that extends between the shoulder and the other toothed member through which the rod extends, the compressed spring urging the other toothed member against the fixed toothed member.

9. The joint of claim 8, in which a tubular extension is co-axially positioned around the axial rod and is integrally formed with the material making up the toothed member.

10. The joint of claim 9, in which the axial rod supporting the toothed members is a clamping member engaging and holding together the opposed toothed members so that their teeth are engaged.

11. The joint of claim 10, in which the teeth of the toothed members are in opposed rings at a relatively large distance from the axis compared to the radial length of the teeth.

12. The joint of claim 10, in which the toothed members on the opposite side thereof further comprise flanges, which are engagable with retaining grooves on the supporting body parts which prevent the flanges and hence the toothed member from turning relative to the body part.

13. A simulated posable skeleton comprising:

a. bones and bone groups simulating a human skeleton, the bone groups defining leg limbs and arm limbs, and a body, b. joints connecting said bones and bone groups so that the connected bones and bone groups are able to be moved rotatably relative to one another, the joints distributed in the arm limbs and leg limbs, respectively, so that each limb has two joints remote from the body, one respective arm and leg limb joint having an axis of rotation which remains generally parallel to the other remote arm and leg limb joint, a third joint connecting each of the arm and leg limbs to the body, and a fourth joint positioned between the third joint and the other two joints, the fourth joint having an axis transverse to the third joint, the combination of joints in each of the limbs enabling the positioning of the bones and bone groups to simulate human postures, and c. at least one of said joints comprising i. a pair of opposed toothed members having mutually engagable radially arranged teeth which engage at incremental rotational positions about an axis of rotation; and ii. means integral with one respective toothed member for engagement with a receptacle on the another respective toothed member for relative rotation of the parts.

14. The skeleton of claim 13, in which the integral means includes an axial shaft which presents a round cross section as it passes through said receptacle and further comprises means on the shaft for preventing the toothed members from moving linearly in the axial direction relative to one another, other than a limited amount to permit the teeth of one member to be moved past the teeth of the other.

15. The skeleton of claim 14, in which the shaft passing through the toothed members is provided with terminations at each end, one of said terminations abutting one of the toothed members and the other termination engaging a compressed spring which in turn engages the other toothed member so as to urge the toothed members together.

16. The skeleton of claim 15, in which the compressed spring lies within an integral tubular extension on one of the toothed members.

17. A simulated posable skeleton comprising:

a. bones and bone groups simulating a human skeleton, b. joints connecting said bones and bone groups so that the connected bones and bone groups are able to be moved rotatably relative to one another, wherein joints are distributed in each arm and leg limb of the human skeleton, respectively, so that each limb has two joints remote from the body portion of the human skeleton, said two remote joints having an axis of rotation which remain generally parallel to one another, a third joint connecting the limbs to the body, and a fourth joint, between the third joint and the other two joints, the fourth joint having an axis of rotation transverse to the other joints, such that the combination of joints in each of the limbs enables positioning of the bones and bone groups to simulate human postures, and c. at least one section of a said limb connected to said joints comprises:

i. precision molded cast hollow pieces which, when assembled together, constitute the limb section, each of the walls of the hollow pieces having narrow edges which fit against similar edges of other hollow pieces of the limb section;

ii. cooperating alignment means located at spaced positions around the edges on the opposed pieces for assuring alignment of the engaged pieces when fit together; and iii. at least one connection means engaging opposed points on the pieces intermediate the edges to hold the pieces together.

18. The skeleton of claim 17 in which the at least one connection means includes a screw which enters from the outside of one piece, the head of which engaging that one piece, and the threaded end of the screw engaging a part of the opposed molded piece.

19. The skeleton of claim 18 in which the aligned molded pieces further include a guide for the at least one screw for receiving the threaded end of the screw.

20. The skeleton of claim 19 in which the guide structure in the screw guiding and receiving structures are integral molded bosses on the hollow pieces.

21. A simulated posable skeleton comprising:

a. bones and bone groups simulating a human skeleton, b. joints connecting said bones and bone groups so that the connected bones and bone groups are able to be moved rotatably relative to one another, wherein joints are distributed in each arm and leg limb of the skeleton, respectively, so that each limb has two joints most remote from a body portion of the skeleton which have axes of rotation that are generally parallel to one another, a third joint connecting the limb to the body, and a fourth joint, between the third joint and the other two joints, the fourth joint having an axis transverse to the others such that the combination of joints in each of the limbs enables positioning of the bones and bone groups to simulate human postures, and c. wherein at least one said joints comprises i. a pair of opposed relatively rotatable toothed members having opposed radially arranged interfitting teeth;

ii. an axial tubular extension along the axis of one of the rotatable toothed members;

iii. an axial bore through the other accommodating the axial extension of the one toothed member so that the toothed members can rotate relative to one another; and iv. means for limiting relative axial movement of the toothed members, the limiting means resiliently urging the rotatable toothed members together so that the teeth are engaged but capable of yielding to permit enough axial movement to allow the teeth to move past one another during forced rotation.

22. The skeleton of claim 21 in which fixing means is provided on each of the rotatable toothed members for permitting its member to be fixed to limbs or body parts of the skeleton connected by the joint so that there can be no relative rotation between that rotatable member and the limb or body part.

23. The skeleton of claim 22 in which said fixing means is an integral flange which has a shape other than round, the flange fitting within the structure of the limb or body part of the skeleton which serves to block the relative rotation between the limb or body part and the toothed member which is engaged by the limb or body part.

* * * * *